J. S. G. BILLETT.
SPRING WHEEL FOR VEHICLES.
APPLICATION FILED JUNE 6, 1916.
1,216,650.
Patented Feb. 20, 1917.
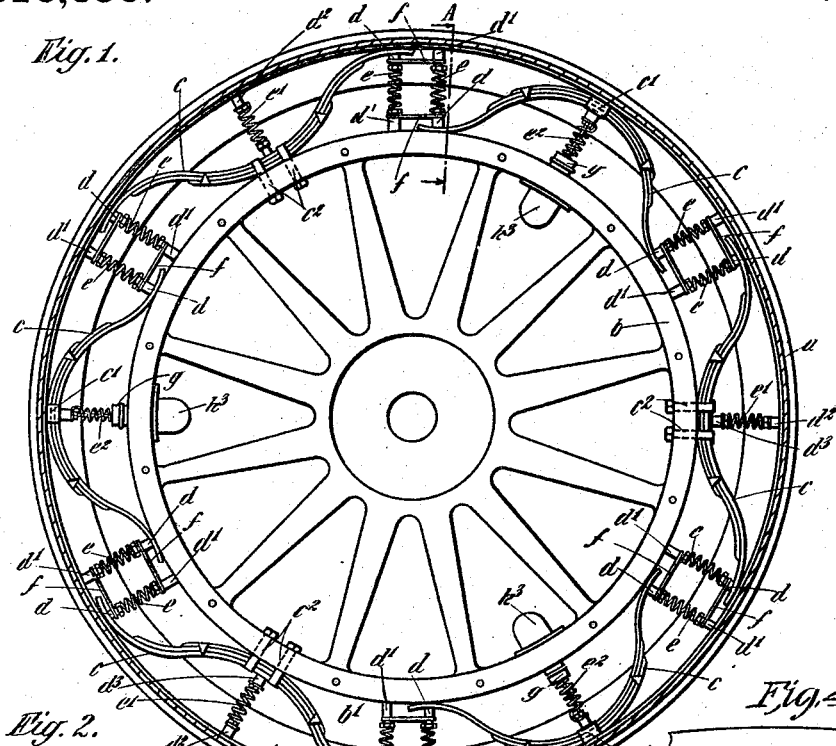
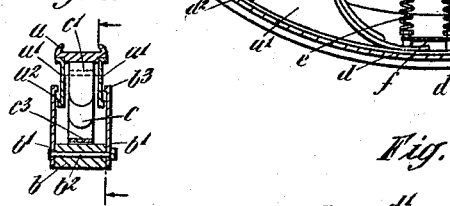
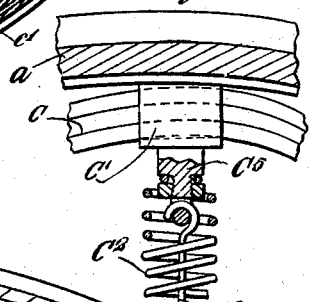
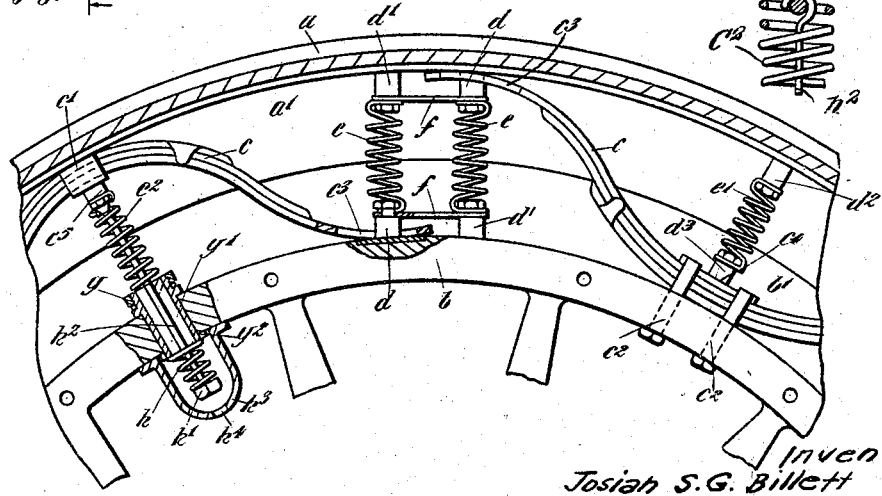
Inventor:
Josiah S. G. Billett

UNITED STATES PATENT OFFICE.

JOSIAH SAMUEL GIST BILLETT, OF TEDDINGTON, ENGLAND.

SPRING-WHEEL FOR VEHICLES.

1,216,650.  Specification of Letters Patent.  Patented Feb. 20, 1917.

Application filed June 6, 1916. Serial No. 101,891.

*To all whom it may concern:*

Be it known that I, JOSIAH SAMUEL GIST BILLETT, a subject of the King of Great Britain, residing at 62 Broad street, Teddington, in the county of Middlesex, England, have invented certain new and useful Improvements in or Relating to Spring-Wheels for Vehicles, of which the following is a specification.

The said invention relates to spring wheels and has for its object to produce a spring wheel more properly resilient, effective and strong than spring wheels as heretofore known.

The main feature of the said invention is the arrangement in combination between outer and inner rims of coiled springs and leaf or plate bow springs of arc-like form, adjacent leaf or plate springs being in reverse position. Other features of the said invention consist in providing in a wheel of the said character for connection of the free end parts of each of the leaf or plate springs with the rim (either the inner or outer rim according to the position of the spring), on which they bear by means of slots with closed ends in the said end parts engaged with projections on the rim and in arranging coiled springs between the middle parts of the leaf or plate springs and the opposite rim and further in arranging within each of the coiled springs connected to the middle parts of the leaf or plate springs secured to the outer rim, a rod articulately connected to the said middle part and passing through an aperture in the inner rim another coiled spring being arranged around the said rod between the inner rim and an abutment on the inner end of the said rod and another feature of the said invention consists in connecting the ends of the coiled springs between the leaf or plate springs to the projections on the rims with which the slotted end parts of the leaf or plate springs are engaged.

The said invention is hereinafter particularly described with reference to the accompanying drawings which illustrate a convenient embodiment of the same.

Figure 1 of the said drawings is a side view of a spring wheel embodying my invention with the side flanges on the near side removed and showing the outer rim in section.

Fig. 2 is a transverse section on the line AA, Fig. 1, and Fig. 3 is an enlarged view of a portion of the outer part of the wheel with the near flanges removed and partly in section, and Fig. 4 is a detail view on a still larger scale, partly in section, illustrating the articulated connection hereinafter referred to.

$a$ is the outer rim of the wheel, which rim is formed to take a solid rubber tire, and $b$ is the inner rim. A flange $a'$ is secured to the outer rim $a$ on each side thereof and a flange $b'$ is secured to each side of the inner rim $b$ by bolts $b^2$. The flanges $a'$ $a'$ are each provided with an outward circumferential projection $a^2$ on its inner periphery and the flanges $b'$ $b'$ are each provided with an inwardly overhanging circumferential projection $b^3$ on its outer periphery. The meeting circumferential parts of the flanges $a'$ $a'$ and $b'$ $b'$ overlap, those of the flanges $b'$ $b'$ being outside those of the flanges $a'$ $a'$. These features of construction and arrangement of the said flanges are well illustrated in Fig. 2. Between the inner and outer rims $a$, $b$ and in the annular chamber formed between them and their flanges, series of plate springs and helically coiled springs are arranged. The plate springs $c$ $c$ are each bow or arc shaped and formed of three leaves after the manner of coach springs and are alternately secured at their middle and strongest parts to the inner and outer rims so that adjacent springs are in reverse position. The springs $c$ connected to the outer rim are secured thereto by bridge pieces $c'$ $c'$ secured to the inner side thereof by screws and the springs $c$ that are connected to the inner rim are secured to the inner side thereof by stirrups $c^2$ $c^2$. The ends of the largest leaf of each spring $c$ bear upon the rim other than that to which the particular spring is rigidly secured and have slots $c^3$ at those parts engaged with studs $d$ secured in the outer or the inner rim as the case may be. Adjacent to each stud $d$ is a stud $d'$ which is in each case opposite the stud $d$ in the other rim. There are consequently, at about the part where two adjacent free ends of the plate springs $c$ $c$ bear on the outer and inner rims respectively, a pair of studs secured in the outer rim opposite a pair of studs secured in the inner rim, the stud $d$ of each pair being opposite the stud $d'$ of the other pair. A helical spring $e$ is arranged between each of the studs $d$ $d'$ in the outer rim and the opposite studs in the inner rim, the ends of each spring $e$ being respectively secured to the respective studs by screw nuts which also serve to secure bridge pieces $f$ $f$ between adjacent studs $d$ $d'$ which bridge pieces enable the studs to which they are connected to give support to one another. A helical spring $e'$ is also arranged between the outer rim and the middle of each spring $c$ secured to the inner rim, the ends of each spring $e'$ being connected respectively by means of screw nuts to a stud $d^2$ on the outer rim and a stud $d^3$ on the bearing plate $c^4$ (see Fig. 3) with which the stirrups $c^2$ $c^2$ are engaged. A helical spring $e^2$ is also arranged between the inner rim and the middle of each spring $c$ secured to the outer rim, each spring $e^2$ being secured at its outer end by means of a screw nut to a stud $c^5$ on the bridge piece $c'$ and secured at its inner end by a screw nut $g$ to a tubular member or ferrule $g'$ secured in the inner rim by a screw nut $g^2$ (see Fig. 3). On the inner side of each ferrule $g'$ a helical spring $h$ (see Fig. 3) is arranged and held in place by a screw nut $h'$ on the end of a rod $h^2$ hooked at its other end to and capable of turning slightly in a hole in the end of the stud $c^5$, so as to form an articulated connection with said stud, as shown in Fig. 4. Over each spring $h$ a cap or dome $h^3$ is secured having an orifice $h^4$ for use in effecting lubrication of the movable parts within it if desirable. The parts $g$ $g'$, $h'$ $h^2$ $h^3$ $h^4$ are best shown in Fig. 3 and one of the springs $h$ is shown in that figure.

When the wheel is in use the springs $c$ $c$ are under their resilience more or less flattened as they come under the center of the wheel and the main weight is resiliently supported by them through the medium of the inner rim which is thus depressed within the outer rim. At the same time those of the coiled springs $e$ $e'$ $e^2$ on the lower side of the wheel for the time being are compressed somewhat and the springs $e$ $e'$ $e^2$ on the upper side of the wheel for the time being are put in tension against the action of their resilience as the distances between the inner and outer rims at that part is increased beyond the normal. At the same time when each of the springs $e^2$ is put in tension the spring $h$ in connection with it is compressed.

The springs $c$ $c$ are all under slight initial compression when the wheel is not in use so that when the wheel is in use and the inner rim is depressed within the outer rim the ends of those of the said springs which are at the upper part of the wheel for the time being remain in spring contact with the inner face of the outer rim. The slots $c^3$ $c^3$ in the springs $c$ $c$ not only permit of the necessary compression or expansion of the said springs but also provide that those of the springs $c$ $c$ for the time being practically out of action (that is those at the sides of the wheel from time to time) shall not prevent the depression of the inner rim under the load and the consequent relative circumferential movement between the two rims at those parts thereof about on a level with the hub from time to time. None of the coiled springs $e$ $e'$ $e^2$ interferes with the said relative circumferential movement and the arrangement of the rods $h^2$ within the hollow ferrules $g'$ and the hook connection between the said rods and the studs $c^5$ $c^5$ also permit of the said movement.

The engagement of the studs or projections $d'$ $d'$ with the slots $c^3$ $c^3$ in the springs $c$ $c$ also prevents undue relative lateral movement of the rims $a$ $b$.

By the said invention it is possible to render thoroughly practicable the use of bow shaped leaf or plate springs by attaining great compactness in their disposition, regularizing or modifying their resiliency and providing against undue relative circumferential and lateral movement of the inner and outer rims.

As springs of the said form are particularly suitable for heavy loads the said invention is specially applicable to wheels for motor cars and motor road vehicles of that class particularly those for use on bad roads such as those for military purposes.

I wish it to be understood that my invention consists in the combinations set forth in the statement hereinafter contained of the invention I claim and I make no claim to any of the elements or features of those combinations apart therefrom.

What I claim and desire to secure by Letters Patent of the United States is:—

1. A spring wheel comprising in combination an outer rim, an inner rim, springs of bow form between said rims, adjacent springs being in reverse position, projections on the said rims, slots in the end parts of said springs engaged with said projections and coiled springs between said rims and connected to said projections.

2. A spring wheel comprising in combination, an outer rim, an inner rim, springs of bow form between said rims, adjacent springs being in reverse position, projections on the said rims, slots in the end parts of said springs engaged with said projections, coiled springs between said rims and connected to said projections, rods articulately connected to the middles of the bow springs secured to the outer rim, passages in the inner rim through which said rods project, coiled springs around said rods and between the said bow springs and the inner rim and coiled springs around said rods between the inner surface of the inner rim and the ends of the said rods.

3. A spring wheel comprising in combination an outer rim, an inner rim, springs of bow form arranged between said rims, adjacent springs being in reverse position and each spring being secured at its middle to one rim and its ends bearing on the other rim, projections on said rims, slots in the end parts of said springs engaged with said projections, a coiled spring arranged between the outer rim and the middle of each bow spring secured to the inner rim, a rod connected to the middle of each bow spring secured to the outer rim, passages in the inner rim through which said rods project, coiled springs around said rods and between the inner rim and the middles of the bow springs to which said rods are connected, coiled springs between the inner side of said inner rim and the inner ends of said rods and a radially disposed coiled spring near each end of each bow spring connected at one end to one of said projections and at the other end to the opposite rim.

In witness whereof, I hereto affix my signature.

JOSIAH SAMUEL GIST BILLETT.

Copies of this patent may be obtained for five cents each, by addressing the "Commissioner of Patents, Washington, D. C."